No. 631,549. Patented Aug. 22, 1899.
F. TALCOTT & F. J. DAUBENBERGER.
MILK SAMPLER.
(Application filed Apr. 3, 1899.)

(No Model.)

Witnesses.

Inventors
Frank Talcott
Fred J. Daubenberger
By Benedict & Morsell
Attorneys

UNITED STATES PATENT OFFICE.

FRANK TALCOTT, OF MAYNARD, AND FRED J. DAUBENBERGER, OF FARMERSBURG, IOWA.

MILK-SAMPLER.

SPECIFICATION forming part of Letters Patent No. 631,549, dated August 22, 1899.

Application filed April 3, 1899. Serial No. 711,588. (No model.)

*To all whom it may concern:*

Be it known that we, FRANK TALCOTT, of Maynard, in the county of Fayette, and FRED J. DAUBENBERGER, of Farmersburg, in the county of Clayton, State of Iowa, have invented a new and useful Improvement in Milk-Samplers, of which the following is a description, reference being had to the accompanying drawings, which are a part of this specification.

It is frequently desirable to take a small quantity or sample of milk from a considerable quantity for the purpose of testing it to ascertain the amount or proportion of butter fat therein. This testing of milk by using a sample thereof is a common practice at creameries in many parts of the country and is commonly done by dipping a cup or measure into the supply of milk and thereby taking a sample therefrom, which is usually from, at, or near the top of the quantity of milk; but as butter fat is of less specific gravity than the other parts of the milk it rises to or toward the surface, so that if a sample is taken from near the top of the milk it is likely to not be a fair sample of the quality of the milk throughout the entire quantity. It is desirable that the sample of milk should be taken not from the upper part of the quantity of milk alone, but also from the middle or lower portion of the supply or quantity of milk.

The object of the present invention is to provide a simple device convenient to use and adapted to take from a quantity of milk a sample thereof not only near the top, but also from deeper down in the supply, even near to the bottom.

The invention consists of the device, its parts, and combinations of parts, as hereinafter described and claimed, or their equivalents.

Figure 1:
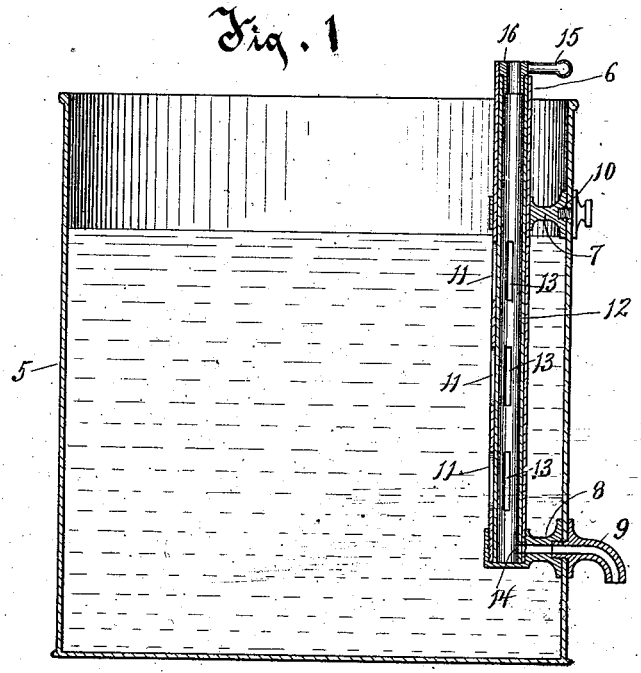
Figure 2:
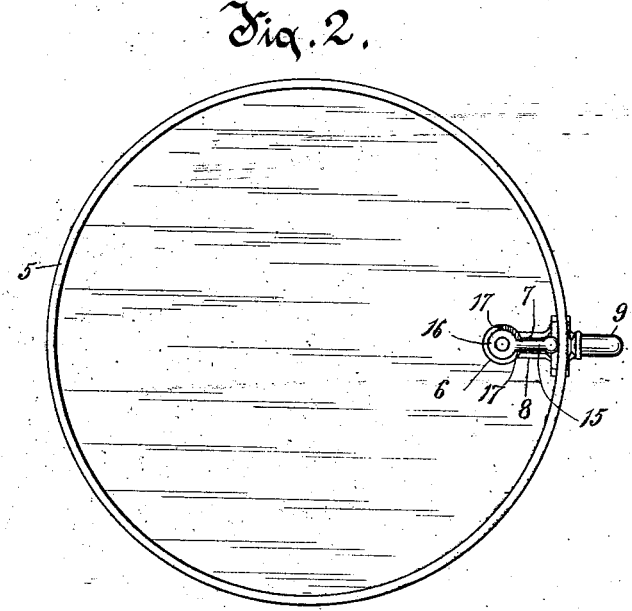
Figure 3:
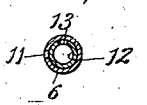

In the drawings, Figure 1 is a central transverse section of a milk can or receptacle with our improved device, also in cross-section, attached thereto. Fig. 2 is a top plan view of the milk-can and the improved device. Fig. 3 is a cross-section of the device through longitudinal slots therein.

In the drawings, 5 is a milk can or receptacle, preferably made of sheet metal and of such size and form as is in common use at creameries for receiving milk therein temporarily for the purpose of weighing it or otherwise. For separating and removing a sample of the milk in the can 5 we provide an upright tubular case 6, that is mounted and supported in the can 5 by means of brackets 7 and 8. The bracket 8 is preferably constructed with a cup-like socket at its inner end adapted to receive therein snugly and liquid-tight the lower end of the case 6, advisably turning into the socket in the bracket by means of a screw-thread. The bracket is secured to the wall of the can 5 preferably by means of a faucet 9, having a stem that extends through an aperture therefor in the wall of the can and turns by a screw-thread into a threaded socket therefor in the bracket 8, the bracket and the faucet being provided with flanges that respectively fit snugly against the inner and outer surfaces of the cam when the stem of the faucet is turned to its seat in the socket in the bracket. The bracket and the faucet are provided with a longitudinal discharge-passage that leads through a registering aperture in the case 6 into the chamber of the case. The bracket 7 has a transverse aperture or band-like construction near its inner end, through which the case 6 passes, and its outer end is placed against and secured to the wall of the can conveniently by a screw 10, turning through the wall of the can into the bracket. The bracket 7 and the screw 10 are provided with flanges that bear, respectively, against the inner and the outer surfaces of the can and hold the bracket in position, forming a liquid-tight joint. The bracket 7 is located at a distance vertically above the bracket 8.

The case 6 is provided with a plurality of vertically-elongated slots 11 11, so disposed as to provide openings from the chamber of the can into the case 6 near its lower extremity and at points at various distances above its lower end. A single elongated slot extending from the lower part of the case 6 upwardly to or near to its top would serve the purpose of these several apertures, but would correspondingly weaken the case, and therefore a series of slots is preferred. Within the case 6 we provide an inner tubular case or tubular valve 12, extending from the bottom of the case 6 upwardly to near its top, which tubular valve is provided with slots 13 13, adapted to register with the slots 11 when in position therefor, but to become non-registering with the slots 11 by a partial rotation of the tubular valve 12. The valve 12 is also provided with a port 14, so disposed as to register with the passage through the bracket 8 and the faucet 9 when the tubular valve 12 is turned to the position shown in Fig. 1, in which the slots 13 are non-registering with the slots 11. A handle 15, attached to the tubular valve 12 conveniently by means of a thereto-affixed rigid plug 16, is adapted for rotating the tubular valve to such an extent as is required to make the device operative. Shoulders 17 17 on the top of the valve-case 6 limit the movement of the tubular valve and serve as a guide by means of which the tubular valve can be readily and accurately moved so as to bring the slots 13 into registration with the slots 11 and reversely into non-registration therewith, but so that the port 14 will register with the passage through the bracket 18 and faucet 9.

In use when the can has been filled or partially filled with a supply of milk the tubular valve 12 is so rotated as to allow milk to enter the case 6 or sample-chamber, and thereupon by partially rotating the tubular valve the sample therein is separated from the supply of milk in the can and is discharged from the sample-chamber through the faucet 9. The supply of milk thus obtained will be drawn from the quantity of milk near the bottom of the can and also at various distances upwardly therefrom to, at, or near the top thereof, whereby a fair and proper sample of the milk is obtained.

What we claim as our invention is—

1. The combination with a milk-receptacle, of a tubular case provided with one or more elongated slots and a port near its lower extremity, means securing the case in a vertical position in the receptacle, a tubular valve fitted rotatably in the case said tubular valve being provided with a slot or slots adapted in one position of the valve to register with the slot or slots in the case and with a port adapted in a certain other position of the tubular valve to register with the port in the valve-case, and means for rotating the tubular valve limitedly.

2. The combination with a milk-receptacle, of a sampler device comprising a vertically-disposed tubular case in the receptacle said case being provided with one or more elongated slots and a port, a tubular valve having a corresponding slot or slots and port fitted and rotatable in the case, brackets secured to the receptacle supporting the sampler-case, and a faucet having a passage continuous with a duct from the sampler-chamber through the lower bracket.

In testimony whereof we affix our signatures in presence of two witnesses.

FRANK TALCOTT.
FRED J. DAUBENBERGER.

Witnesses to Frank Talcott's signature:
O. A. KAYE,
F. E. BLETHEN.

Witnesses to Fred J. Daubenberger's signature:
JAMES T. ADAMS,
E. V. MATHEWS.